Mar. 13, 1923.
L. B. BANCH
1,448,182
INTERNAL COMBUSTION ENGINE
Filed Nov. 23, 1917
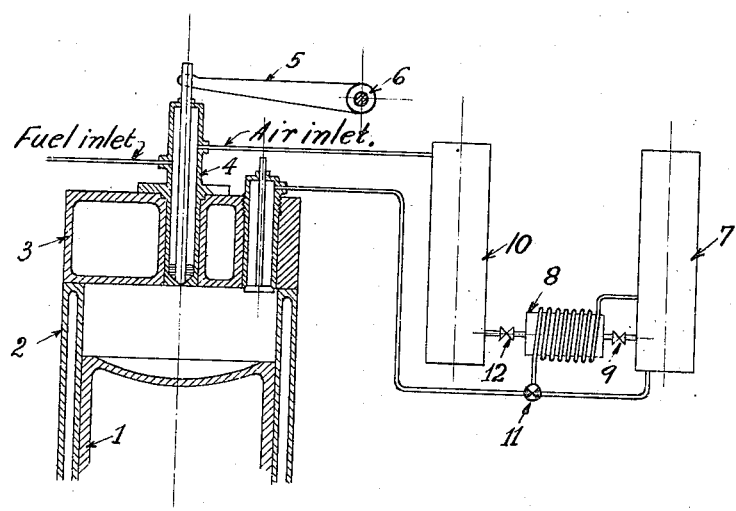
*Ladislaus B. Banch*
INVENTOR Patented Mar. 13, 1923.

1,448,182

UNITED STATES PATENT OFFICE.

LADISLAUS B. BANCH, OF CLEVELAND, OHIO.

INTERNAL-COMBUSTION ENGINE.

Application filed November 23, 1917. Serial No. 203,571.

*To all whom it may concern:*

Be it known that I, LADISLAUS B. BANCH, a citizen of the United States of America, residing at Cleveland, in the county of Cuyahoga and the State of Ohio, have invented a new Internal-Combustion Engine, of which the following is a specification.

My invention relates to an internal combustion engine, in which the fuel is injected into the cylinder-space by means of high pressure air, the fuel being either in liquid form or previously vaporized or gasified, said injection being done by utilizing the heat of the compressed air or the heat of the gases taken from the cylinder of the engine, and thus dispose of the air compressor now employed for furnishing the high pressure air for this purpose.

Of the many possible solutions in the accompanying drawing is shown in partial sectional elevation one, just for the purpose of illustrating the idea:

In this solution the high pressure air taken from the engine-cylinder with high temperature is used to heat up the injection air and thus create the necessary high pressure.

1 is the piston, 2 the cylinder, 3 the cylinder-head, in which is located the fuel injection valve 4, which is actuated by means of lever 5 from shaft 6. On the left is shown the fuel inlet to this valve and on the right the high pressure air inlet. This air is taken from the engine cylinder with high pressure and high temperature and is cooled down on its way to the air storage tank 7 by going around the air vessel 8 and heats up the contents of this. 7 is filled with high pressure and low-temperature air taken from tank 7 after it was well cooled down there. The pressure of the air in this vessel 8 will be raised by being heated up by the hot air coming from the engine cylinder. Valve 9 prevents this air from flowing back to tank 7, but instead of this it forces its way into the other air storage tank 10, which was already filled with high pressure air of equal or higher pressure than that in 7, and thus raises the pressure in it. After the air in vessel 8 is heated up as much as thought advisable, I change the flow of the compressed air by valve 11, so that it will flow directly into tank 7, as shown, without first heating up the contents of 8, which will be cooled down now gradually, thus the pressure falling in it below the pressure in tank 7, which is also filled with cool air of about atmospheric temperature. As soon as this happens valve 9 will open and admit air from 7 to 8, when the heating up of the contents of 8 will begin again, after this air is cooled down. This way I will fill up tank 10 with air at sufficiently high pressure to affect the fuel injecting into the engine cylinder. During the regular operation of the engine I just have to supply enough high pressure air to tank 10 to keep the pressure in it between the proper limits to effect the fuel-injecting. Valve 12 prevents the high pressure air in tank 10 from flowing back into 8, when the pressure in that falls below the pressure in 10.

Similar arrangement can be used for creating the high pressure or in part or in whole, necessary for the starting of the engine or to affect the scavenging of the engine cylinder in case of two cycle engine, in fact anywhere, where high pressure is needed for any operation of the engine.

I claim:

Process for creating the high pressure of the air to be used for fuel injection, starting or scavenging in connection with internal combustion engines, which consists of raising the pressure of the air taken from the cylinder of the engine during the compression stroke at high pressure and temperature by cooling it down first without lowering its pressure below that existing in the cylinder at that point of the compression stroke, and then heating it up by an external source of heat and thereby raising its pressure by utilizing the expansive force of the air when heated up.

LADISLAUS B. BANCH.